Dec. 13, 1949           G. J. LEXA           2,491,413
WELDING CONTROLLER
Filed July 25, 1946
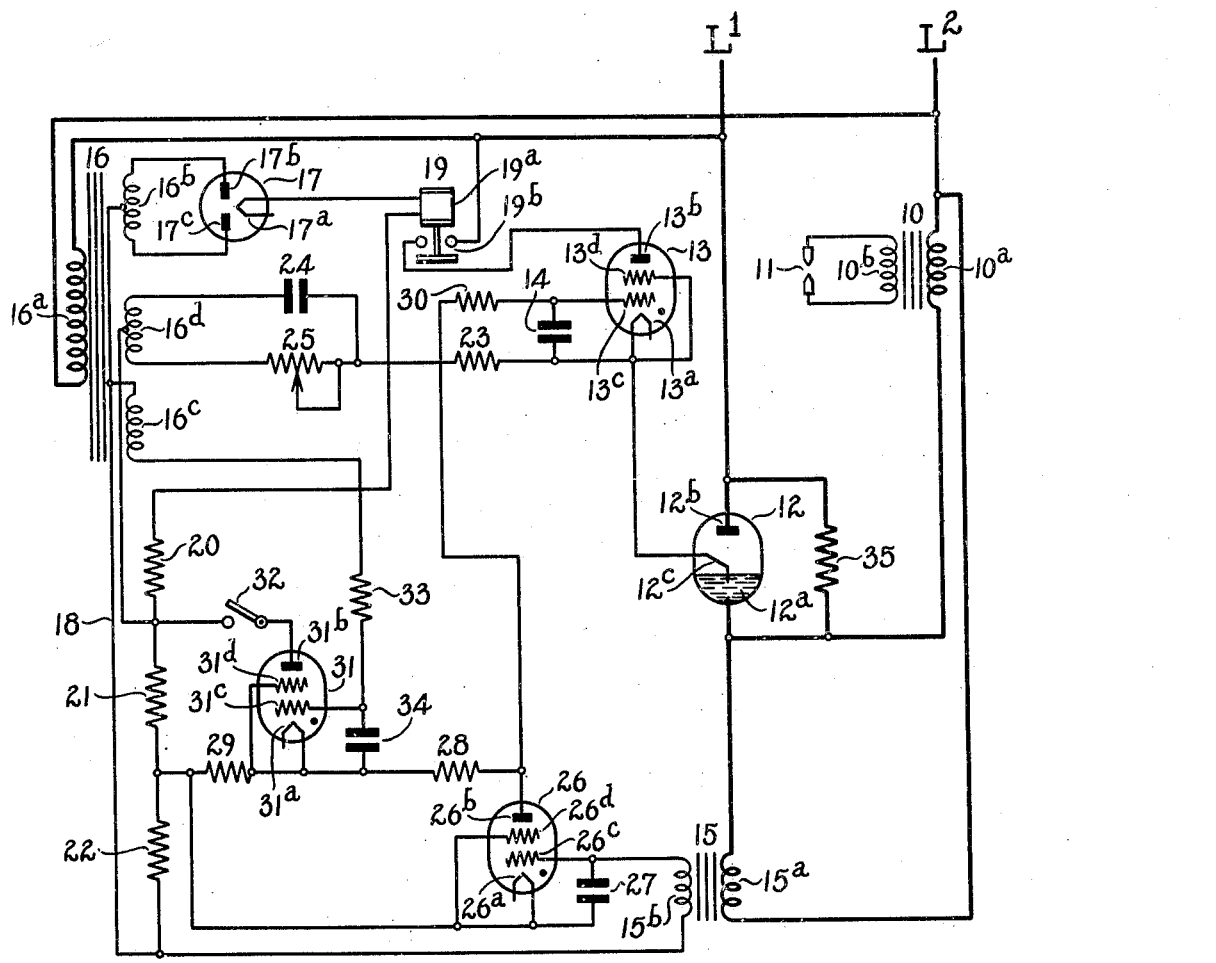

Patented Dec. 13, 1949

2,491,413

UNITED STATES PATENT OFFICE 2,491,413

WELDING CONTROLLER

George J. Lexa, Wauwatosa, Wis., assignor to Cutler-Hammer, Inc., Milwaukee, Wis., a corporation of Delaware Application July 25, 1946, Serial No. 686,186

8 Claims. (Cl. 219—4)

1

The invention relates to the control of current impulses and while not limited thereto it is particularly applicable to the control of a single impulse of welding current passed through a workpiece which is to be welded. The invention is an improvement on the system disclosed and claimed in the copending application of Cox et al., Serial No. 653,269, filed March 9, 1946, and assigned to the same assignee as the present invention.

In the aforementioned application a welding cycle is initiated by a pilot switch which controls the energizing circuit of an electromagnetic relay. Upon response the relay commutates electronic means which thereupon initiate current flow in the welding circuit during a preselected fraction of a single positive half cycle of an alternating voltage. The conductivity of the electronic means can be so adjusted that conduction of welding current may start at any desired moment after voltage zero at the start of a positive half cycle, whereby the total amount of energy supplied to the work may be regulated.

The employment of an electromagnetic relay as an intermediary between the pilot switch and the electronic means for initiating welding current flow requires careful design and adjustment of said relay as slight variations in its speed of response or bouncing of said relay have undesired effects. Thus a more stable control having the advantageous characteristics of the earlier control aforementioned is highly desirable, and the present invention has among its objects to afford such improved control.

More specifically an object of the invention is to provide improved means for controlling the supply from a welding transformer of a single unidirectional current impulse upon closure of a pilot control device.

Another object is to provide means for highly accurate control of the amount of energy supplied to the welding current by a single welding impulse.

Another object is to provide a controller of the aforementioned type which is quick and reliable in its response.

Another object is to provide protection against undesired current flow heretofore experienced as the result of failure in performance of the parts of the system.

Other objects and advantages will hereinafter appear.

The accompanying drawing is illustrative of a welding system embodying the invention.

Referring to the drawing, the system as de-

2 scribed in this paragraph is like that of the copending application aforementioned. $L^1$, $L^2$ are the bus bars of an alternating current supply circuit. The circuit supplies current to a welding transformer 10, having a primary winding $10^a$ and a secondary winding $10^b$. The winding $10^b$ is connected to welding electrodes 11 which operate in the usual manner to weld parts clamped therebetween. One terminal of the winding $10^a$ is connected to the bus bar $L^2$, while its second terminal is connected to the cathode $12^a$ of a gaseous tube or ignitron 12. The tube 12 has an anode $12^b$ which is connected to the bus bar $L^1$, and has also an ignition electrode $12^c$, which is connected to the cathode $13^a$ of a gaseous electron tube or thyratron 13. The tube 13 has an anode $13^b$, a shielding electrode $13^d$ connected to a cathode $13^a$, and a control electrode $13^c$ connected to the cathode $13^a$ through a capacitor 14. Connected across the terminals of the primary winding $10^a$ is the primary winding $15^a$ of an auxiliary transformer 15 which is also provided with a secondary winding $15^b$.

Energy for operating some of the control circuits of the system is supplied through a transformer 16 which has a primary winding $16^a$ connected across lines $L^1$ and $L^2$, two center tapped secondary windings $16^b$ and $16^d$ and a third secondary winding $16^c$. The secondary winding $16^b$ has its outside taps connected to the anodes $17^b$ and $17^c$ of a full wave rectifier shown as tube 17 which tube also has a filamentary cathode $17^a$ heated in any suitable manner (not shown). The center tap of the winding $16^b$ is connected to an auxiliary bus bar 18. Interposed between the cathode $17^a$ and the bus bar 18 is an energizing winding $19^a$ of relay 19 and in series therewith a voltage divider comprising three series connected resistors 20, 21 and 22. The relay 19 has normally open contacts $19^b$ connected between the bus bar $L^1$ and the anode $13^b$. The cathode $13^a$ is further connected through a current limiting resistor 23 to the common terminal of a capacitor 24 and a variable resistor 25 which together are connected across the winding $16^d$ to form therewith a phase shifting network. The center tap of the winding $16^d$ is connected to a point intermediate of the resistors 20 and 21.

The phase of the potential of the cathode $13^a$ with respect to the grid $13^c$ is modified by the phase shifting network. This potential is in turn under the control of a gaseous tube or thyratron 26 having a cathode $26^a$, an anode $26^b$, a control electrode $26^c$ connected through a capacitor 27 to the cathode $26^a$ and a shielding electrode 26$^d$, directly connected to the cathode 26$^a$. The cathode 26$^a$ is connected to the common terminal of resistors 21 and 22. The control electrode 26$^c$ is also connected to one terminal of the transformer winding 15$^b$, while the other terminal of said transformer winding is connected to the negative bus bar 18. The anode 26$^b$ is connected through resistors 28 and 29 to the common terminal of resistors 21 and 22 and through a resistor 30 to the control electrode 13$^c$.

The voltage impressed upon the control electrode 13$^c$ from the phase shifting network aforementioned is modified by a gaseous tube 31 which has an anode 31$^b$ connected through a pilot switch 32 to the common terminal of the resistors 20 and 21. The cathode 31$^a$ of tube 31 is connected to the common terminal of the resistors 28 and 29, and control electrode 31$^c$ is connected through a current limiting resistor 33 to one terminal of the transformer winding 16$^c$, the other terminal of which is connected to the bus bar 18. The control electrode 31$^c$ is also connected through a by-pass capacitor 34 to the cathode 31$^a$. The shielding electrode 31$^d$ is directly connected to cathode 31$^a$. The usual provision (not shown) may be employed to prevent voltage being impressed on the various tubes upon energization of the system until the respective tube filaments are heated to the normal operating temperature. The main electrodes of tube 12 are connected by a relatively high impedance 35.

The operation of the system is as follows: When the bus bars L$^1$, L$^2$ are energized and the rectifier tube 17 becomes conducting, direct current flows from winding 16$^b$ over the rectifier 17, through coil 19$^a$, resistors 20 to 22, back to winding 16$^b$. The relay 19 is thus energized and closes contacts 19$^b$ to connect anode 13$^b$ to bus bar L$^1$. As long as the control switch 32 is open the control grid 13$^c$ of tube 13 has impressed upon it a unidirectional potential which is negative with respect to the cathode 13$^a$ by an amount equal to the voltage drop in the resistor 21. Superposed on this unidirectional potential is an alternating potential derived from the phase shift circuit 24—25. The phase of said alternating potential with respect to the cathode-grid potential may be varied in a well known manner by adjustment of the resistor 25 so that the resultant potential of the control electrode 13$^c$ passes the critical ignition value at a selected moment of the positive half waves of the potential between the main electrode of tube 13 to start current conduction therethrough. As long as the switch 32 is open, the unidirectional potential is always greater than the amplitude of said alternating potential so that the resultant grid potential prevents initiation of current flow through the tube 13. As initiation of current conduction by the tube 12 depends upon current flow to the ignition electrode 12$^c$ through tube 13 the tube 12 also is prevented from conducting.

While the tube 12 is nonconducting, a small current flows from the line L$^1$ through the high impedance 35, winding 15$^a$ and in parallel with the latter through winding 10$^a$ to L$^2$. The current through winding 10$^a$ is sufficient to eliminate the residual magnetism from transformer 10 due to previous high intensity magnetization by a welding current impulse, but it is insufficient to induce a substantial current in the winding 10$^b$ which might cause arcing at the electrodes 11 upon closure of the welding current circuit through the workpiece. The current through the winding 15$^a$ induces a voltage in the winding 15$^b$. This voltage raises the potential of the grid 26$^c$ with respect to the cathode 26$^a$. However, the rise is so low as not to substantially affect the unidirectional negative bias of the grid 26$^c$ with respect to the cathode 26$^a$ due to the voltage drop through the resistor 22. Hence tube 26 remains nonconducting.

If now the pilot switch 32 is closed, a unidirectional voltage equal to the voltage drop in resistor 21 is impressed upon the main electrodes of tube 31. The grid 31$^c$ has impressed on it by the winding 16$^c$ an alternating potential which is substantially 180 degrees out of phase with the voltage between L$^1$ and L$^2$. As long as switch 32 is open, however, the anode circuit is open and tube 31 does not conduct current. Upon closure of switch 32, tube 31 becomes conducting at the beginning of the first negative half cycle of the voltage of the bus bars L$^1$, L$^2$, and it thereafter remains conducting until the switch 32 is again opened. As soon as tube 31 becomes conducting, the component of the negative D. C. voltage bias on the grid 13$^c$ of tube 13, which is due to the voltage drop in resistor 21, is reduced to a value equal to the anode-cathode drop in the tube 31. This reduction of the unidirectional negative bias of tube 13 permits initiation of conduction of said tube at a moment which depends upon the adjustment of the phase shifting resistor 25. Hence at a given moment of the positive half cycle of the main voltage the resultant potential of the grid 13$^c$ reaches the ignition value and current flow between the main electrodes of said tube 13 is established. For the remainder of the respective half cycle current flow in the tube 13 results in a flow of ignition current to the ignition electrode 12$^c$ of tube 12 which then conducts and causes welding energy to flow through the transformer winding 19$^a$ to supply welding current to the welding electrodes 11.

The limitation of welding energy supplied by the welding transformer 10 to a single half cycle or fraction thereof subsequent to closure of the switch 32 is controlled by the tube 26 in the following manner: When tube 31 conducts current, the voltage drop in resistor 29 is impressed upon the main electrodes of tube 26, but the latter is nonconducting because its control electrode is negative with respect to its cathode, due to the voltage drop in resistor 22. The alternating voltage in the winding 15$^b$ is superposed upon this negative bias of the grid 26$^c$ of tube 26. However, with the tube 12 conducting, the voltage impressed upon the winding 15$^a$ is increased as the impedance 35 is substantially short circuited by the current flowing through the tube 12. This increased voltage increases the alternating bias on the grid 26$^c$ supplied by the transformer winding 15$^b$ so that the biasing potential of the grid 26$^c$ permits initiation of conduction of the tube 26 whereupon said tube continues to conduct. As soon as the tube 26 becomes conducting the negative bias on the grid 13$^c$ is increased due to the voltage drop in the resistor 28 resulting from the current flow in tube 26. Hence on the succeeding positive half cycles the grid 13$^c$ of the tube 13 remains again sufficiently negative to prevent conduction of the tube 13 and ignition of the tube 12, so that no more welding energy can flow through the welding transformer 10. As long as the tube 31 is conducting, the voltage drop through the resistor 29 remains sufficiently high to maintain the tube 26 conducting, which in turn prevents conduction in tubes 13 and 12. Hence if it is desired to obtain another impulse of welding current it will be necessary to open the switch 32 which renders the tube 31 nonconducting. The tube 26 is thereby also rendered nonconducting because now the potential between its main electrodes is substantially zero. The system thus is returned to its initial condition and a second welding cycle may be initiated, as aforedescribed, by closure of the switch 32.

If the rectifying tube 17 should fail or failure should occur in the resistors 20, 21 and 22, or any part thereof should become grounded, the relay 19 would become deenergized or its energization would be reduced, so that it opens its contacts, thus preventing energization of tube 13 and thereby preventing unwanted current flow through the welding transformer.

I claim:

1. In an energy control system the combination with electronic means including a thyratron tube, an alternating current supply for the main electrodes of said tube, means subjecting a control electrode of said tube to an alterating voltage bias out of phase with the voltage of said main electrodes and means subjecting such control electrode to a unidirectional voltage bias, the former bias being for initiation of discharge of said tube and the latter bias normally preponderating the former to block current flow through said tube, of a pilot switch, electronic means responsive to operation of said pilot switch and upon response being effective to terminate preponderation of the aforementioned unidirectional voltage bias thereby to permit the aforementioned alternating voltage bias to initiate flow of a single unidirectional current pulse through said tube at a given moment during a positive half cycle of the voltage to which its main electrodes are subjected, and means responsive to abnormal conditions of the source of said unidirectional bias to interrupt the alternating current supply to the main electrodes of said thyratron tube.

2. In an energy control system the combination with electronic means including a thyratron tube, an alternating current supply for the main electrodes of said tube, means subjecting a control electrode of said tube to an alternating voltage bias out of phase with the voltage of said main electrodes and means subjecting such control electrode to a unidirectional voltage bias the former bias being for initiation of discharge of said tube and the latter bias normally preponderating the former to block current flow through said tube, of a pilot switch, electronic means responsive to operation of said pilot switch and upon response being effective to terminate preponderation of the aforementioned unidirectional voltage bias thereby to permit the aforementioned alternating voltage bias to initiate flow of a single unidirectional current pulse through said tube at a given moment during a positive half cycle of the voltage to which its main electrodes are subjected, and means conditioned as an incident to the aforementioned action of said last named electronic means to initiate as a function of discharge of said thyratron tube re-establishment and maintenance of preponderation of said unidirectional voltage bias pending re-operation of said pilot switch for terminating said preponderation.

3. In an energy control system the combination with electronic means including a thyratron tube, an alternating current supply for the main electrodes of said tube, a unidirectional biasing source, means subjecting a control electrode of said tube to an alternating voltage bias out of phase with the voltage of said main electrodes and to a bias from said unidirectional source the former bias being for initiation of discharge of said tube and the latter bias normally preponderating the former to block current flow through said tube, of a pilot switch, electronic means responsive to operation of said pilot switch and upon response being effective to terminate preponderation of the aforementioned unidirectional bias thereby to permit the aforementioned alternating voltage bias to initiate flow of a single unidirectional current pulse through said tube at a given moment during a positive half cycle of the voltage to which its main electrodes are subjected, and an electromagnetic relay in circuit with the current supply to the main electrodes of said tube and responsive to abnormal conditions of said unidirectional source to interrupt said current supply to the main electrodes of said tube.

4. In an energy control system the combination with electronic means including a thyratron tube, an alternating current supply for the main electrodes of said tube, means to subject a control electrode of said tube to an alternating voltage bias out of phase with the voltage of said main electrodes and to a unidirectional voltage bias normally preponderating to block the current flow through said tube, of a pilot switch, a second and a third thyratron, means responsive to operation of said pilot switch to render said second thryratron conducting for terminating preponderation of the aforementioned unidirectional voltage bias thereby to render the aforementioned alternating voltage bias effective to initiate current flow through said first thyratron tube at a given moment during the positive half cycle of the voltage to which its main electrodes are subjected, and means to initiate conduction of said third thyratron in response to the discharge current of said first thyratron to re-establish and maintain preponderation of said unidirectional voltage bias, pending re-operation of said pilot switch for terminating said preponderation.

5. In an energy control system the combination with electronic means including a thyratron tube, an alternating current supply for the main electrodes of said tube, means to subject a control electrode of said tube to an alternating voltage bias out of phase with the voltage of said main electrodes and to a unidirectional voltage bias normally preponderating to block the current flow through said tube, of a pilot switch, a second and a third thyratron, means responsive to operation of said pilot switch to render said second thyratron conducting for terminating preponderation of the aforementioned unidirectional voltage bias thereby to render the aforementioned alternating voltage bias effective to initiate current flow through said first thyratron tube at a given moment during the positive half cycle of the voltage to which its main electrodes are subjected, and means to initiate conduction of said third thyratron in response to the discharge current of said first thyratron to neutralize the effect of conduction of said second thyratron upon said first thyratron and to re-establish and maintain preponderation of said unidirectional voltage bias, pending re-operation of said pilot switch for terminating said preponderation.

6. In a welding system the combination with an ignitron, an alternating current supply for the main electrodes of said ignitron, welding electrodes deriving welding energy from said supply as a function of discharge of said ignitron, an electron discharge tube in circuit with the ignitor of said ignitron and said alternating current supply, a unidirectional biasing source, means subjecting a control electrode of said tube to an alternating voltage bias out of phase with the voltage of said main electrodes and to a bias from said unidirectional source the former bias being for initiating discharge of said electron tube and the latter bias normally preponderating the former to block current flow through said tube, of a pilot switch, electronic means responsive to operation of said pilot switch and upon responding being effective to terminate preponderation of the aforementioned unidirectional bias thereby to permit the aforementioned alternating voltage bias to initiate current flow through said tube for supplying ignition current to said ignitor and initiating discharge of said ignitron at a given moment during a positive half cycle of the voltage to which its main electrodes are subjected, and an electromagnetic relay in circuit with the current supply to the main electrodes of said tube and responsive to abnormal conditions of said unidirectional source to interrupt said current supply to the main electrodes of said tube.

7. In a welding system the combination with an ignitron, an alternating current supply for the main electrodes of said ignitron, welding electrodes deriving welding energy from said supply as a function of discharge of said ignitron an electron discharge tube in circuit with the ignitor of said ignitron and said alternating current supply, means subjecting a control electrode of said tube to an alternating voltage bias out of phase with the voltage of said main electrodes and means subjecting the control electrode to a unidirectional voltage bias the former bias being for initiating discharge of said tube and the latter bias normally preponderating the former to block the current flow through said tube, of a pilot switch, a first and a second thyratron, means responsive to operation of said pilot switch to render said first thyratron conducting and said first thyratron when conducting being effective for terminating preponderation of the aforementioned unidirectional voltage bias thereby to permit the aforementioned alternating voltage bias to initiate current flow through said electron tube for supplying ignition current to said ignitor and initiating discharge of said ignitron at a given moment during the positive half cycle of the voltage to which its main electrodes are subjected, and means to initiate conduction of said second thyratron in response to the discharge current of said electron tube, said second thyratron being then effective to re-establish and maintain preponderation of said unidirectional voltage bias, pending re-operation of said pilot switch for terminating said preponderation.

8. In a welding system the combination with an alternating current supply, an ignitron having its main electrodes in circuit with said supply, welding electrodes deriving welding energy from said supply as a function of discharge of said ignitron, a first thyratron having its main electrodes in circuit with said supply and the ignitor of said ignitron, means subjecting a control electrode of said thyratron to an alternating voltage bias out of phase with the voltage of its main electrodes and means subjecting the control electrode to a unidirectional voltage bias the former bias being for initiating discharge of said thyratron and the latter bias normally preponderating the former to block the current flow through said thyratron, of a pilot switch, a second and a third thyratron, means responsive to operation of said pilot switch to render said second thyratron conducting and said second thyratron when conducting being effective for terminating preponderation of the aforementioned unidirectional voltage bias thereby to permit the aforementioned alternating voltage bias to initiate current flow through said first thyratron at a given moment during the positive half cycle of the voltage to which its main electrodes are subjected, and means to initiate conduction of said third thyratron in response to the discharge current of said ignitron, said third thyratron being then effective to neutralize the effect of conduction of said second thyratron upon said first thyraton and to re-establish and maintain preponderation of said unidirectional voltage bias pending re-operation of said pilot switch for terminating said preponderation.

GEORGE J. LEXA.

REFERENCES CITED

The following references are of record in the file of this patent:

UNITED STATES PATENTS

| Number | Name | Date |
|---|---|---|
| 2,158,885 | Palmer | May 16, 1939 |
| 2,166,309 | Lord | July 18, 1939 |
| 2,169,023 | Dawson | Aug. 8, 1939 |
| 2,259,331 | Vedder | Oct. 14, 1941 |
| 2,290,543 | Dawson | July 21, 1942 |
| 2,347,935 | Collom | May 2, 1944 |